March 2, 1926.
E. C. NORTON
PISTON RING
Filed Dec. 11, 1924
1,574,926
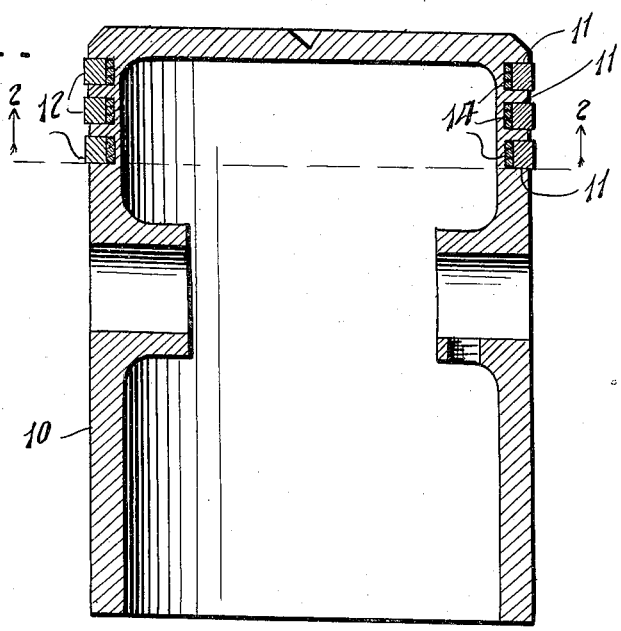
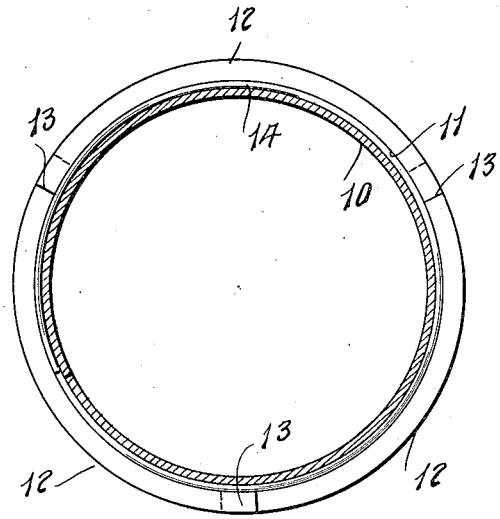
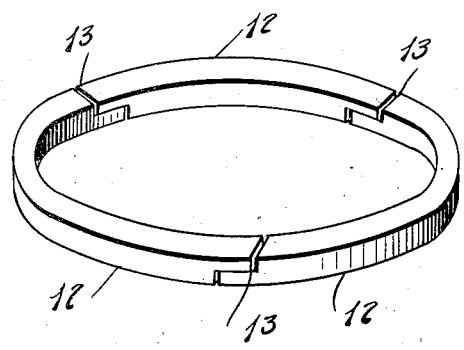
Inventor
E. C. Norton,
By
Attorney Patented Mar. 2, 1926.

1,574,926

UNITED STATES PATENT OFFICE.

ERNEST C. NORTON, OF MOLINE, ILLINOIS.

PISTON RING.

Application filed December 11, 1924. Serial No. 755,227.

*To all whom it may concern:*

Be it known that I, ERNEST C. NORTON, a citizen of the United States, residing at Moline, in the county of Rock Island and State of Illinois, have invented certain new and useful Improvements in Piston Rings; and I do hereby declare the following to be a full, clear, and exact description of the invention, such as will enable others skilled in the art to which it appertains to make and use the same.

The present invention relates to a metal ring for use as a packing in conjunction with a piston in which is formed a groove to receive the packing ring, and in accordance with the present invention, the packing ring is of sectional formation, the meeting ends of the sections being lapped, and said sections being normally pressed outwardly by means of a coil spring disposed in the groove of the piston between the bottom of the groove and the inner side of the packing ring, said spring consisting of a length of spring wire coiled upon itself and obtaining a snug fit between opposite walls of the said groove, the expansive action of the spring normally tending to press the sections of the piston ring outwardly and in close contact with the inner wall of the cylinder.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a sectional view of a piston illustrating the application of the invention, Figure 2 is a sectional view on the line 2—2 of Figure 1, and Figure 3 is a detail perspective view of a piston ring embodying the invention.

Corresponding and like parts are referred to in the following description and designated in the several views of the drawings by like reference characters.

The numeral 10 denotes a metal piston in which is formed annular grooves 11 to receive piston rings in a manner well understood. In accordance with the present invention, the piston ring comprises similar or like sections 12, the meeting ends of which are lapped as indicated at 13 to maintain a close joint, the piston ring obtaining a snug fit within the piston grooves 11.

A coil spring 14 is disposed within each of the piston grooves and is arranged between the bottom thereof and the inner side of the piston ring, said spring consisting of a length of spring wire coiled upon itself, the diameter of the wire and the number of coils being such as to enable the spring to obtain a snug fit between opposite walls of the piston grooves, as indicated most clearly in Figure 1, and this spring normally tends to expand and press the sections 12 of the piston ring outwardly to maintain a close joint between the inner wall of the cylinder and the outer sides of the packing or piston ring as will be readily understood.

What is claimed is:—

In combination with a piston having a peripheral groove for a ring, a ring disposed in said groove comprising a plurality of sections having their meeting ends lapped and their inner walls straight and unobstructed from top to bottom, and a spring wire coiled upon itself a plurality of times to provide an expansive body disposed between said wall and the inner wall of the groove and directly engaging the top and bottom walls of the groove.

In testimony whereof I affix my signature.

ERNEST C. NORTON.